Figure 1:
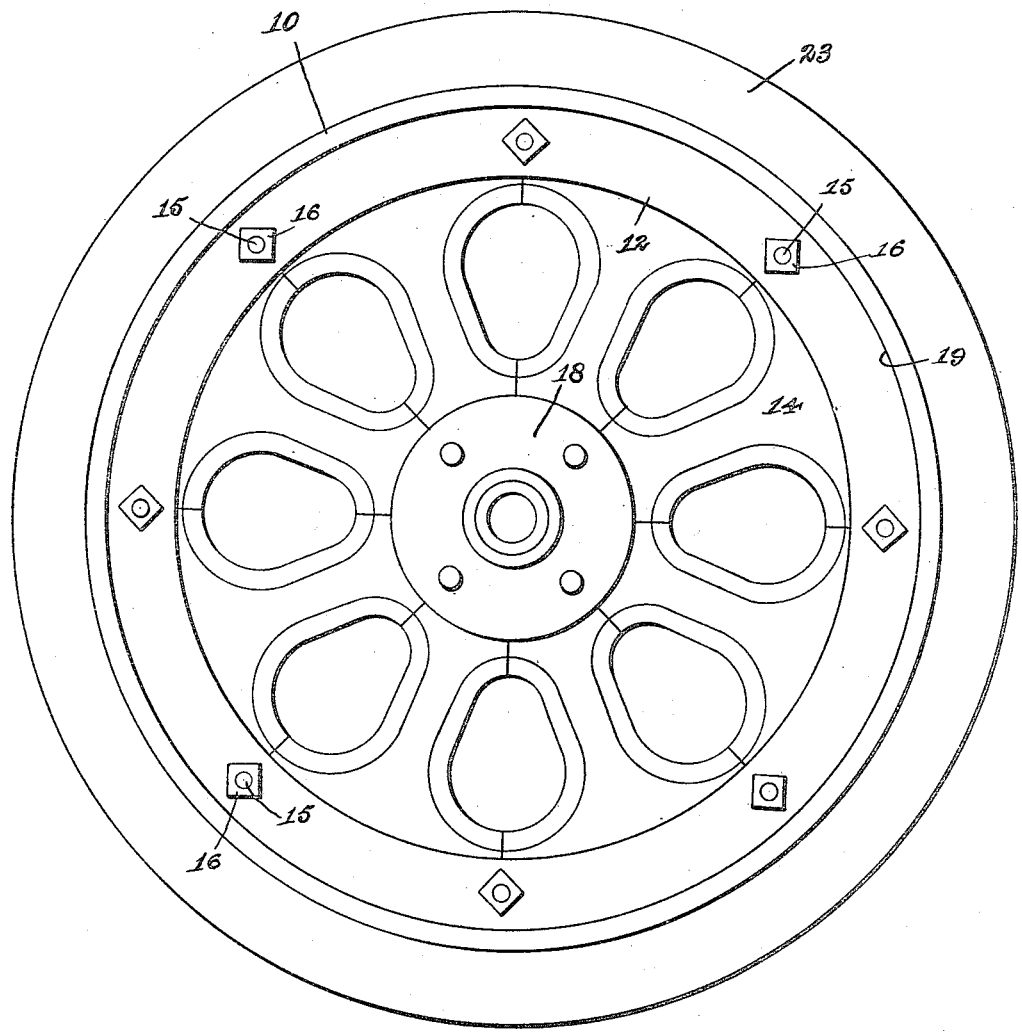

W. E. ADAMS.
CAR WHEEL.
APPLICATION FILED JAN. 11, 1918.

1,267,350.

Patented May 28, 1918.
2 SHEETS—SHEET 1.

Inventor:
Warrington E. Adams

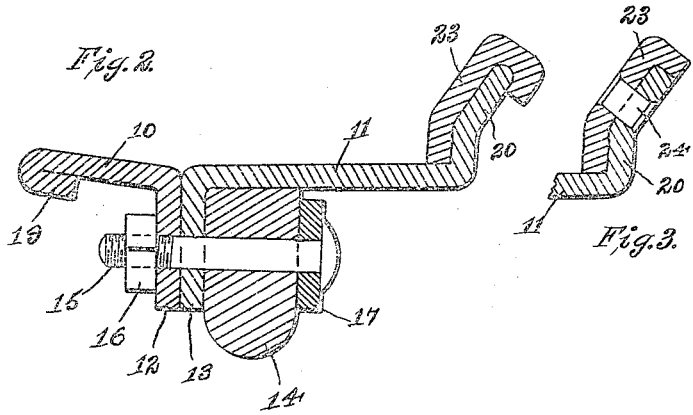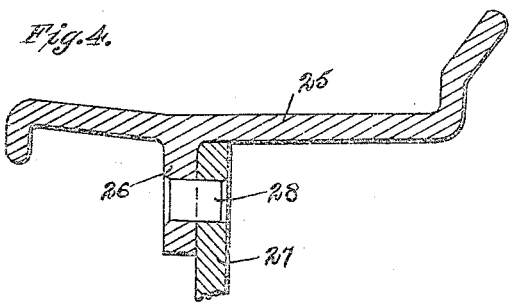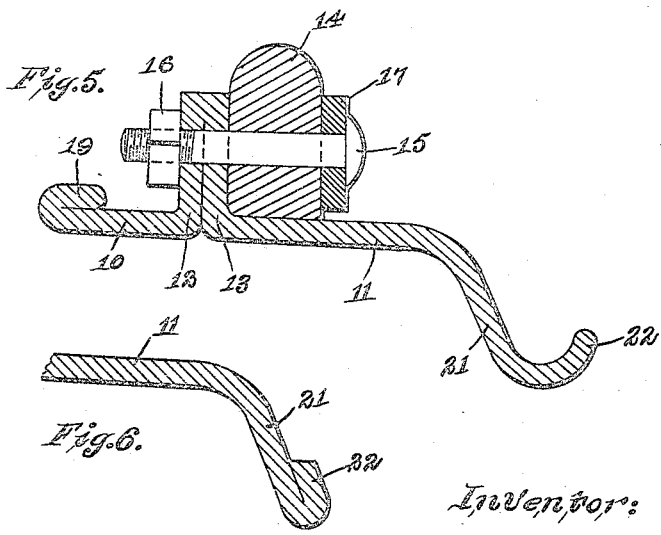

UNITED STATES PATENT OFFICE.

WARRINGTON E. ADAMS, OF CHICAGO, ILLINOIS.

CAR-WHEEL.

1,267,350.  Specification of Letters Patent.  Patented May 28, 1918.

Application filed January 11, 1918. Serial No. 211,369.

*To all whom it may concern:*

Be it known that I, WARRINGTON E. ADAMS, a citizen of the United States, and resident of the city of Chicago, county of Cook, and State of Illinois, have invented certain new and useful Improvements in Car-Wheels, of which the following is a specification.

My invention relates to improvements in car wheels, especially of that class used in connection with railway motor cars, and has for its object the production of a wheel of this character which will be of durable and economical construction, and which will be highly efficient in use.

A further object is the production of a car wheel of the character mentioned, which will be so constructed as to permit of ready and expeditious substitution or renewal of a worn part, and which will be effectually reinforced at the place ordinarily subjected to the greatest wear, thereby greatly extending the life of the wheel. Other objects will appear hereinafter.

With these objects in view my invention consists in the combinations and arrangements of parts hereinafter described and claimed.

The invention will be best understood by reference to the accompanying drawings, forming a part of this specification, and in which:

Figure 1 is a side elevation of a car wheel embodying the invention,

Fig. 2 an enlarged transverse section through the rim portion of the wheel shown in Fig. 1, Fig. 3 a fragmental detail section of a modified form of the construction of Fig. 2, Fig. 4 a view similar to Fig. 2 of another form of rim and wheel center part embodying the invention, Fig. 5 a slightly modified form of construction shown in Fig. 2, and Fig. 6 a fragmental detail section of a modified form of the construction of Fig. 5.

One form of the invention illustrated in Figs. 1 and 2 of the drawings comprises a rim consisting of two annular sections, 10 and 11. Said sections 10 and 11 are of uniform diameter, the same being arranged side by side with their inner edges contiguous. Said edges are formed with inwardly projecting, annular flanges 12 and 13 respectively.

The wheel center part, or spokes, 14 register with and engage against the outer side of flange 13, said parts 12, 13 and 14 being securely, but detachably connected together by bolts, 15 and coöperating nuts, 16.

The center part or spokes, 14 are formed of wood, and for reinforcement an annular washer plate, 17 is provided, which is interposed between the former and the heads of bolts, 15. Any form of hub, 18 may be used to which the wheel center part, or spokes will be suitably connected.

For reinforcement the outer edge of rim section, 10 is formed with a turned back annular flange, 19. The outer edge of rim section, 11 is formed with an outwardly projecting, annular flange, 20 which constitutes the flange proper of the wheel. It has been found that in use, the inner side of flange, 20 is subjected to a tremendous wear and, it has been found, that this flange, where unprotected and not reinforced, wears out far ahead of any other part of the wheel, necessitating discarding or scrapping of the wheel, notwithstanding that the other parts thereof are still in good condition and practically unworn. In order to reinforce and protect this flange, I have provided an annular guard or plate, 23 which may be spun over said flange as seen in Fig. 2, or secured thereto as by rivets, 24, as seen in Fig. 3. With this arrangement, the member 23 will receive and bear all of the wear which otherwise would be directed against the flange, 20, and upon said member 23 becoming worn or disabled, the same may be removed and a new one inserted in its place. Thus the life of the wheel, as is apparent, will be greatly extended.

By forming the rim of two detachably connected sections, 10 and 11, in the event of wear or disabling of either of said parts the same may be readily and quickly removed and a new part arranged in its place, discarding of the entire wheel, in case of disabling of any part being thus avoided. Moreover the cost of manufacture of a built up or assembled wheel of this character has been found to be considerably less than that of an integral or one-piece rim construction of corresponding design. The inwardly projecting flanges, 12 and 13 of the rim being located intermediate the lateral edges of the rim, renders it possible to connect the same directly to the wheel center part or spokes, without the use of a felly, such as is employed in the conventional construction of wheels of this character.

In Fig. 5 is shown a rim construction practically the same as that described, except that in this construction the inner edges of the flanges, 12 and 13 are united, the entire rim being formed of a single piece. The advantages last pointed out with reference to avoiding the necessity of employment of a felly obtains with equal force to this construction. In this construction also and in Fig. 6 are shown flanges 21 of another design which may be employed, the turned back portions 22 of said flange, as here shown lending, of course, additional strength and rigidity to the rim.

In Fig. 4 the rim 25 is of an integral construction, being provided with an inwardly projecting medial flange, 26, said rim and flange being of a drawn construction, or, if desired, the rim may be formed from a flat strip and the flange, 26 welded thereto. In this construction, also, a wheel center part, 27, is shown of metallic construction, which is secured to said flange by rivets, 28. The employment of a metallic center part, of course avoids the necessity of using a washer plate such as 17, which is employed where the center part is of wood.

While I have illustrated and described the preferred forms of construction for carrying my invention into effect these are capable of variation and modification. I therefore do not wish to be limited to the precise details of construction set forth, but desire to avail myself of such variations and modifications as come within the scope of the appended claims.

What I claim as new and desire to secure by Letters Patent of the United States is:

1. A car wheel comprising a rim divided on a circumferential line positioned intermediate the lateral edges thereof; inwardly projecting flanges provided on the divided portions of the rim at the meeting edges thereof; and a center part connected with said flanges.

2. A car wheel comprising a rim divided on a circumferential line positioned intermediate the lateral edges thereof; inwardly projecting flanges provided on the divided portions of the rim at the meeting edges thereof, the inner edges of said flanges being united; and a center part connected with said flanges.

3. A car wheel comprising a rim formed of two annular sections detachably connected together at their inner sides.

4. A car wheel comprising a rim formed of two annular independent sections; a wheel center part; and means arranged at the inner side of the rim for detachably connecting said rim sections and center part.

5. A car wheel comprising a rim formed of two annular sections arranged side by side with contacting edges; inwardly projecting flanges at said edges; and means for detachably connecting said flanges.

6. A car wheel comprising a rim formed of two annular sections arranged side by side with contacting edges; inwardly projecting flanges at said edges; a wheel center part registering with and contiguous to said flanges; and means for detachably connecting said flanges and center part.

7. A car wheel comprising a rim formed of two annular sections arranged side by side with contacting edges; inwardly projecting flanges at said edges; a wheel center part registering with and contiguous to said flanges; a washer plate arranged at the opposite side of said center part; and means for connecting said flanges, center part and washer plate.

8. A car wheel comprising a rim having an outwardly projecting annular flange; and a reinforcing element embracing said flange and covering the inner side thereof.

9. A car wheel comprising a rim having an outwardly projecting flange; and a reinforcing element secured to said flange and extending over the inner side and outer edge thereof.

10. A car wheel comprising a rim having an inwardly projecting medial flange; and offset annular flanges formed at both of the lateral edges of said rim.

11. A car wheel, comprising a rim, formed of two annular independent sections; and means at the inner side of said rim for connecting said sections together.

In testimony whereof, I have signed my name to this specification in the presence of two subscribing witnesses.

WARRINGTON E. ADAMS.

Witnesses:
 THOMAS J. MULLEN,
 MAURICE J. MORIARTY.

Copies of this patent may be obtained for five cents each, by addressing the "Commissioner of Patents, Washington, D. C."